United States Patent [19]

Russell et al.

[11] Patent Number: 4,644,853
[45] Date of Patent: Feb. 24, 1987

[54] PISTON AND BEARING ASSEMBLIES

[75] Inventors: Robert A. Russell, Ann Arbor; Trevor J. Moore, Farmington Hills; Timothy V. Schafer, Livonia, all of Mich.

[73] Assignee: General Motors Corporation, Detroit, Mich.

[21] Appl. No.: 674,097

[22] Filed: Nov. 23, 1984

[51] Int. Cl.[4] .............................................. F16J 1/14
[52] U.S. Cl. ...................................... 92/190; 92/238; 123/193 P; 384/273
[58] Field of Search ........... 92/187, 230, 238, DIG. 2, 92/188–191; 123/193 P, 197 AB; 384/273, 288, 294

[56] References Cited

U.S. PATENT DOCUMENTS

| 212,665 | 2/1879 | Defreest . | |
|---|---|---|---|
| 1,341,938 | 1/1920 | Shoemaker . | |
| 1,789,089 | 1/1931 | Tobler . | |
| 2,069,594 | 2/1937 | Schneider . | |
| 2,532,912 | 12/1950 | Hickman et al. | 384/294 |
| 2,687,930 | 8/1954 | Smith . | |
| 2,703,264 | 3/1955 | Pitner . | |
| 2,720,794 | 10/1955 | Morris | 384/294 |
| 2,850,340 | 9/1958 | Brill . | |
| 3,119,640 | 1/1964 | Laudig . | |
| 3,433,539 | 3/1969 | Nigh . | |
| 3,448,664 | 6/1969 | Hulsing . | |
| 3,476,021 | 11/1969 | Williams . | |
| 3,555,972 | 1/1971 | Hulsing | 123/193 P |
| 3,625,580 | 12/1971 | DeHart et al. . | |
| 3,656,582 | 4/1972 | Alcock . | |
| 3,705,753 | 12/1972 | Bierlein et al. . | |
| 3,762,389 | 10/1973 | Malina . | |
| 3,789,743 | 2/1974 | Sihon . | |
| 3,801,173 | 4/1974 | McKindree . | |
| 3,943,908 | 3/1976 | Kubis et al. . | |
| 4,072,371 | 2/1978 | Hill et al. . | |
| 4,383,719 | 5/1983 | Matzelle . | |

FOREIGN PATENT DOCUMENTS 90219  10/1957  Norway .............................. 384/294

Primary Examiner—Edward K. Look
Attorney, Agent, or Firm—Robert J. Outland

[57] ABSTRACT

In a preferred embodiment, a crosshead piston assembly for four-stroke cycle engines includes a novel piston pin bearing assembly having opposed less than semicylindrical insert bearings retained by engagement of arcuately opposite coplanar edge surfaces with like mating surfaces of respective recesses to provide an assembly capable of being practically manufactured to close dimensional tolerances. Broad potential application of the bearing concept is suggested.

9 Claims, 5 Drawing Figures

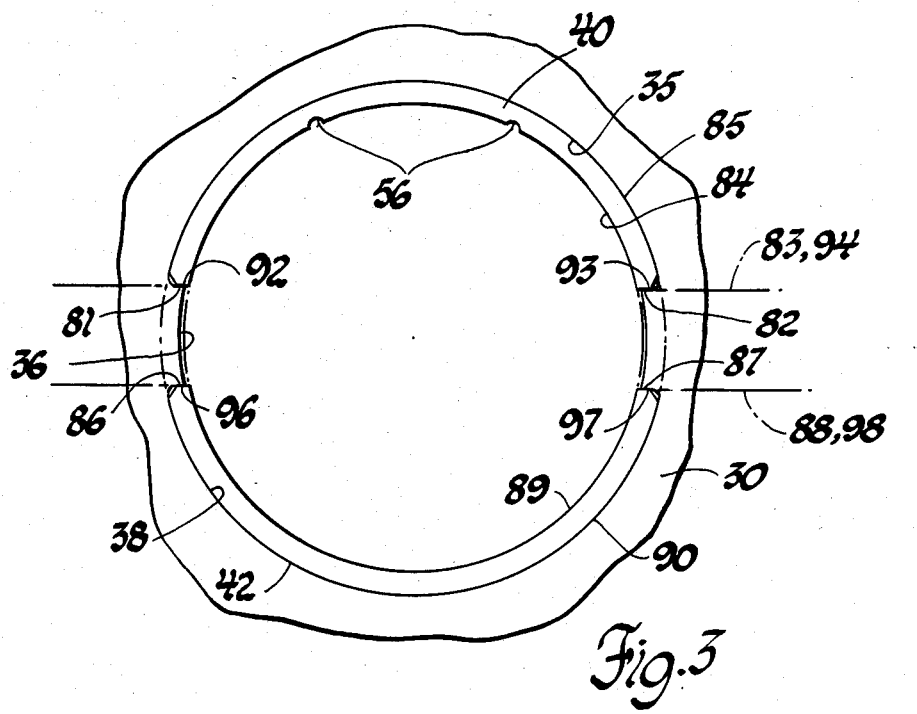
Fig. 3
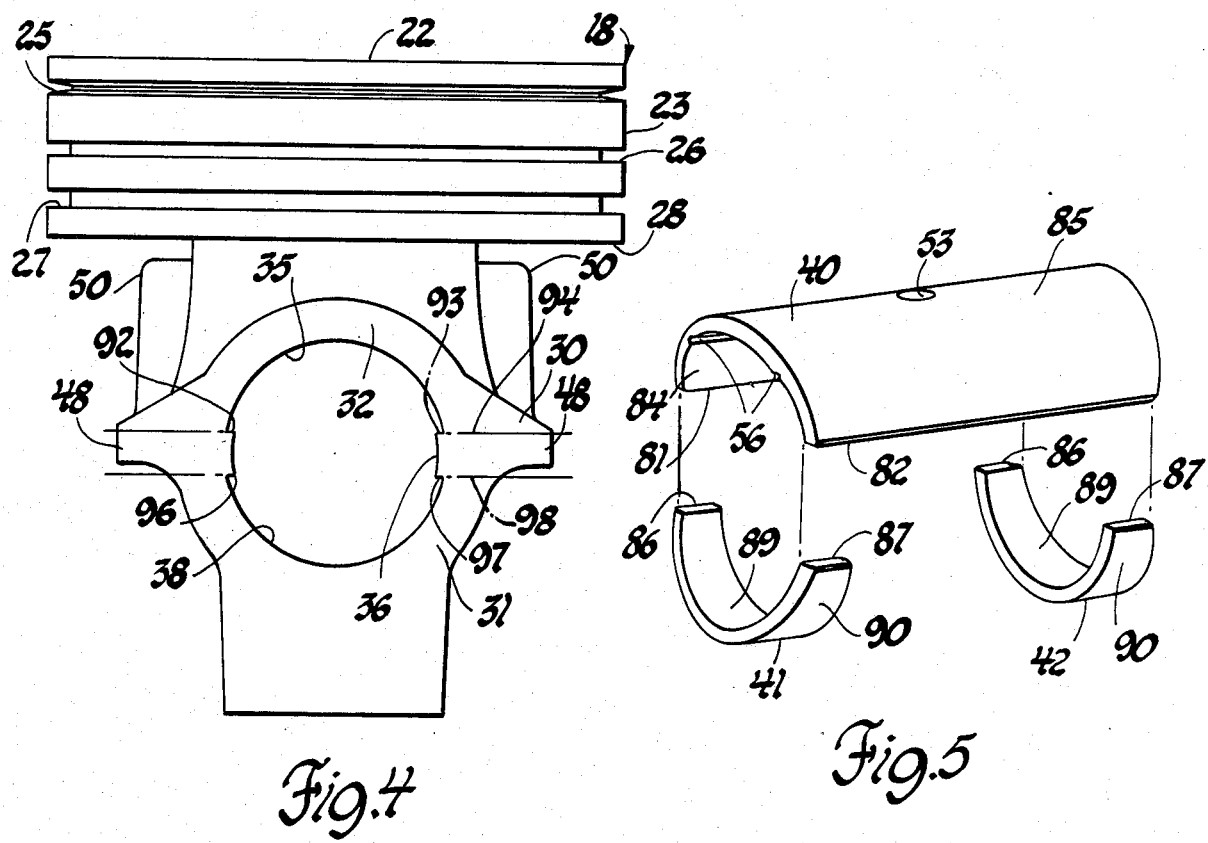
Fig. 4
Fig. 5

PISTON AND BEARING ASSEMBLIES

TECHNICAL FIELD

This invention relates to piston assemblies and insert bearing assemblies for use with piston pin joints and other insert bearing applications. In a specific embodiment, the invention relates to a four-stroke cycle engine piston insert bearing assembly.

BACKGROUND

Insert bearing shells have been used in numerous bearing applications including, but not limited to, engine main and connecting rod bearings, railway vehicle axle bearings and engine piston pin bearings of various types. In the particular case of engine piston pin bearings, a commonly used application has been as the main load carrying bearing in the oscillating piston pin joint of two-cycle engine pistons. Pertinent examples of the latter include U.S. Pat. Nos. 3,433,539 Nigh, 3,555,972 Hulsing and 3,762,389 Malina, all assigned to the assignee of the present invention.

In these two-stroke cycle engine piston applications, an insert bearing shell is received within a recess on the main thrust receiving side of a piston pin receiving bore in a member of the two-stroke cycle piston assembly. Bearing inserts are generally not needed in the opposite portions of the bore adjacent the connecting rod, since reverse loading of the piston pins in two-stroke cycle engines is seldom encountered or is of negligible value. For this reason also, the piston pin bore in such piston assemblies can be made with relatively large clearance around the piston pin portions which do not engage the bearing insert.

In four-stroke cycle engine pistons, the operating conditions may impose significant reverse loads on the piston pins during the piston intake and exhaust strokes when outward centrifugal forces are not significantly counteracted, and may be added to, by low or below ambient cylinder pressures acting on the pistons. Thus, in four-stroke cycle piston assemblies, load carrying bearings are commonly required on both the top and bottom sides of the piston pin. Known constructions include the use of individual bushings as in U.S. Pat. Nos. 2,850,340 Brill and 3,943,908 Kubis et al. A one piece bushing with extended upper surface is shown in U.S. Pat. No. 2,069,594 Schneider. These arrangements not only provide load carrying capability in both directions of piston reciprocation, but also provide a close piston pin to bearing clearance that is desirable to minimize the shock loads from changes in load direction occurring in the operation of four-stroke cycle engine pistons.

Past attempts to apply the advantages of the two-stroke cycle piston slipper-type less than semicylindrical insert bearing technology to four-stroke cycle engines have been impaired by relatively loose manufacturing tolerances required on the bearing inside diameter and bearing crush. Currently, such slipper-type bearings with arc lengths less than 180° are dimensioned on an arc-length basis. Thus, the arcuately opposite edges of the bearing shell and the cooperating edges of the recess in which the shell is received generally define surfaces lying in planes that extend radially from the center of the arc formed by the piston pin bearing. As a result, required manufacturing tolerances make it difficult to obtain, in a practical way, adequately close diametral tolerances between oppositely placed slipper bearing inserts for engaging the piston pin of a four-stroke cycle engine piston.

SUMMARY OF THE INVENTION

The present invention provides a novel form of slipper-type insert bearing assembly which permits the holding of sufficiently close diametral tolerances to provide successful application to a four-stroke cycle engine piston assembly. In addition, the novel slipper-type insert bearing arrangement is also capable of being applied with advantage to other applications where insert bearings have or may be used.

The invention involves the use of a dimensioning scheme for the insert bearing and its associated recess, both extending over arc lengths substantially less than 180°, wherein the mating edges of the bearing insert and the insert receiving recess are formed, at least partially, by coplanar end surfaces. The coplanar surfaces preferably define a common chord of the coaxial arcuate cylindrical surfaces defining inner and outer surfaces of the part cylindrical bearing shell.

This dimensioning scheme permits the individual bearing segments to be manufactured by processes which are similar to those currently used in half-shell type bearings extensively used for journal applications such as engine main bearings and connecting rod large end bearings. In this practice, diametral tolerances are minimized by maintaining close control of bearing shell thickness and the dimension of shell height from the bearing outer diameter to the chord defined by the coplanar edges. Dimensions of the bore and opposing bearing-receiving recesses may be controlled by accurate machining, such as by broaching. In this manner, adequate control of pin to bearing clearance may be maintained even when dual opposed bearing inserts are utilized on opposite sides of a piston pin.

These and other features and advantages of the invention will be more fully understood from the following description of a preferred embodiment taken together with the accompanying drawings.

BRIEF DRAWING DESCRIPTION

In the drawings:

FIG. 3 is an enlarged side view of a the piston assembly from the plane indicated by the line 3—3 of FIG. 1, the piston pin and connecting rod portions being omitted for clarity;

FIG. 4 is a side view of the piston head portion of the piston assembly of FIGS. 1 and 2, and FIG. 5 is a pictorial view of the slipper bearing inserts prepared for installation in the head member of FIG. 4 to form part of the assembly of FIGS. 1-3.

DETAILED DESCRIPTION

Figure 1:
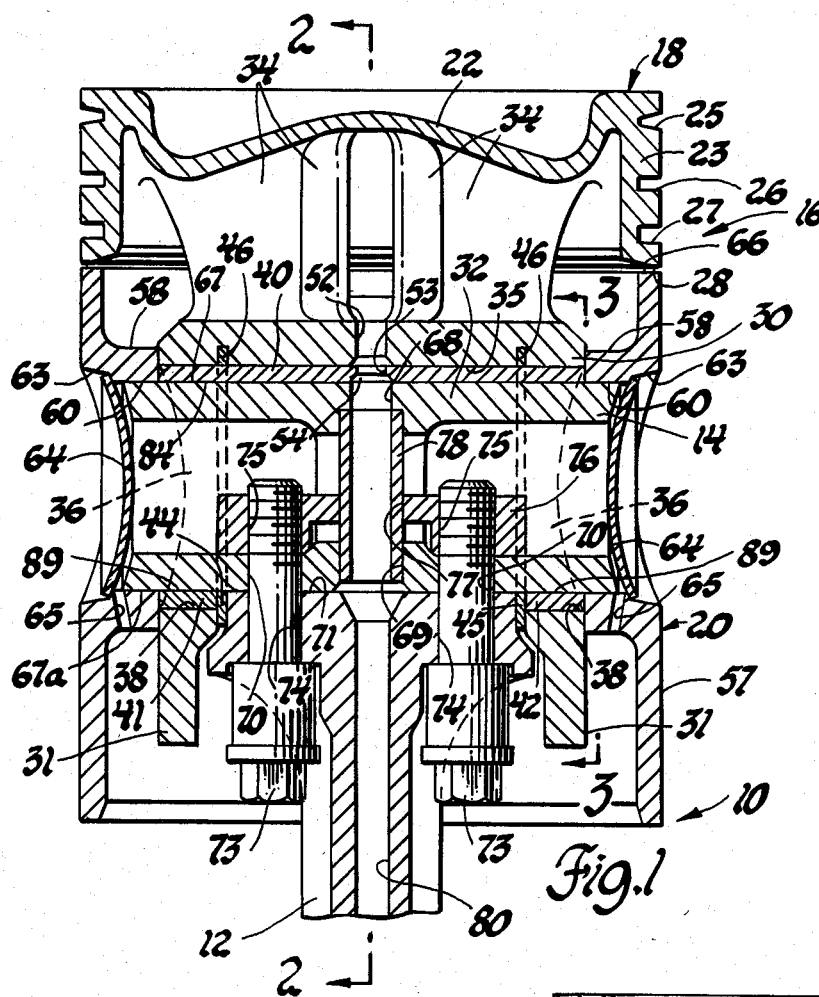
FIG. 1 is a cross-sectional view through the piston pin axis of a crosshead piston assembly intended for use in four-stroke cycle engines and including slipper insert bearing means in accordance with the invention.
Figure 2:
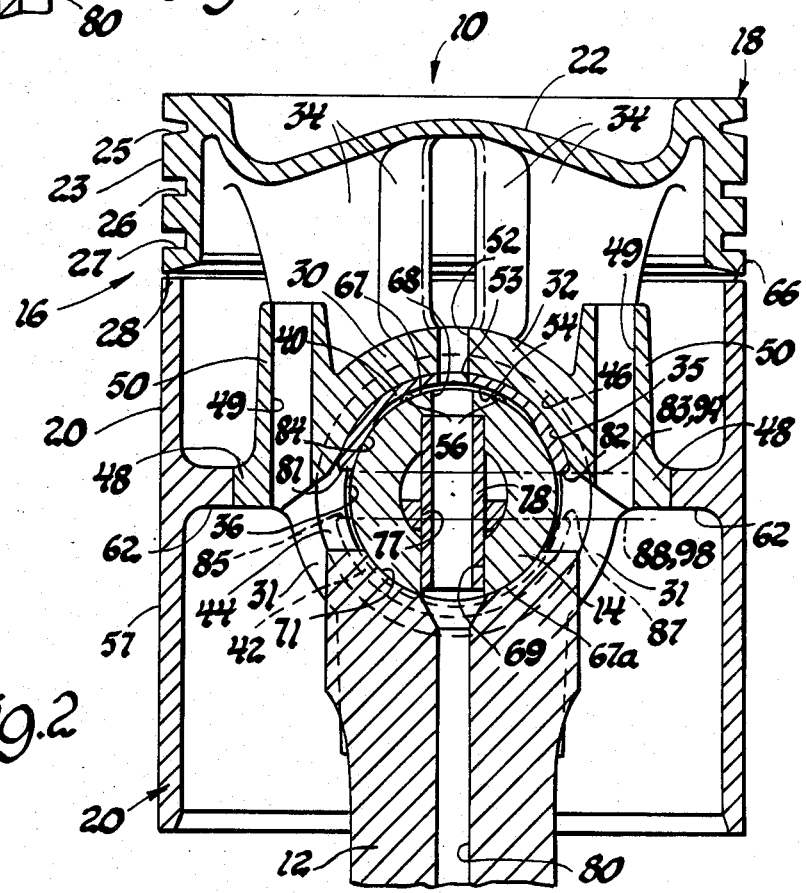
FIG. 2 is a cross-sectional view of the piston assembly from the plane generally indicated by the line 2—2 of FIG. 1.

Referring now to the drawings in detail, numeral 10 generally indicates a crosshead piston-connecting rod assembly intended for use especially in four-stroke cycle engines and formed in accordance with the invention. Assembly 10 includes a connecting rod 12, a piston pin 14 and a piston assembly generally indicated by numeral 16. The piston assembly includes two primary elements—a head member 18 and a skirt or crosshead member 20, each of which is integrally formed preferably of cast iron.

The head member 18 includes a crown section 22, from the outer edge of which depends an annular ring belt section 23 containing three ring grooves 25, 26, 27 for receiving respectively top and second compression rings and an oil control ring. Below the oil ring groove 27, the ring belt section terminates at an annular end 28.

The piston head member further includes a piston pin connecting section 30 generally comprising a pair of spaced downwardly extending pin encircling arms 31 interconnected at their upper ends by a saddle portion 32. The saddle 32 and arms 31 are connected with the crown section by a plurality of axially and radially extending struts or columns 34.

Saddle portion 32 defines a downwardly opening part cylindrical upper recess 35 extending into, and coaxially aligned transversely of the piston axis with, a pair of piston pin receiving openings 36 formed in the pin encircling arms 31. Openings 36 additionally define a pair of upwardly opening part cylindrical lower recesses 38. Recesses 35 and 38 receive and retain, in a manner to be subsequently more fully explained, part cylindrical slipper-type insert bearings 40, 41, 42, each of less than semicylindrical arcuate extent. Optionally, retaining rings 44, 45 may be retained in grooves 46 in the saddle portion to extend around the bearing insert 40 and inwardly beside the pin encircling arms 31 to engage the inner ends of bearing inserts 41, 42 so as to prevent their inward movement along their respective recesses 38.

Between arms 31 and around the adjacent recess 35, the saddle portion is flared outwardly as at 48. A pair of oil drain openings 49 are drilled vertically through the outwardly flared portion 48 and may extend upwardly into optional standpipes 50 provided for a purpose to be subsequently described. Cooling oil supply openings 52 and 53 are provided in the center of the saddle portion and bearing insert respectively, the latter also having an arcuate distribution recess 54 in its inner surface connecting with opening 53 and with oil distribution grooves 56 formed in the bearing inner surface.

The crosshead or skirt member 20 includes a generally cylindrical wall 57 having a pair of centrally located oppositely disposed inwardly extending bosses 58. The bosses have cylindrical pin receiving openings 60 which, when the head member and skirt member are assembled, are coaxially aligned with the pin receiving openings 36 of the head member pin connecting section. The bosses 58 are interconnected circumferentially of the skirt by ribs 62. Short counterbores 63 are provided near the outer ends of the pin receiving openings 60 to receive metal closure plates 64. Inwardly of the counterbores 63, the bosses 58 are provided, at their lower ends, with oil drain openings 65.

The skirt cylindrical wall 57 extends sufficiently above and below the pin receiving openings 60 to provide an adequate bearing surface for engaging an associated cylinder liner and absorbing side thrust forces acting on the piston. At its upper end, the skirt wall 57 terminates at an annular end 66 which extends close to the lower end 28 of the piston head ring belt section 23, with preferably a small clearance to permit relative motion of the independent head and skirt sections.

The head and skirt members of the piston assembly are retained together by the cylindrical piston pin 14 which has oppositely facing upper and lower part cylindrical surfaces 67, 67a received in openings 60, 36 of the skirt and head members respectively. The skirt is supported for oscillation on the pin by direct contact between the interiors of the openings 60 with the outer ends of the cylindrical pin surfaces 67, 67a. The head member 18 is supported for oscillating motion on the pin 14 by engagement of a substantial portion of the pin's upper surface 67 with the bearing insert 40 retained within the downwardly opening upper recess 35 in the saddle portion 32 and pin receiving openings 36 and by engagement of smaller portions of the pin's lower surface 67a with the bearing inserts 41, 42 received in lower recesses 38 in the lower portions of openings 36 in the pin encircling arms 31. The piston pin 14 is hollow, having a slightly thickened wall at its center where oppositely disposed upper and lower openings 68, 69 respectively are provided. On opposite sides of the lower opening 69 a pair of bolt clearance openings 70 are also provided.

The lower surface 67a of piston pin 14 is secured against a saddle portion 71 on the longitudinal force transmitting axis of the connecting rod 12 by means of bolts 73 which extend through openings 74 in the rod and openings 70 of the piston pin into an engagement with threaded openings 75 of an elongated nut 76 disposed within the piston pin 14. Nut 76 also includes a central opening 77 which is aligned with openings 68, 69 of the pin and, together with them, receives a tube member 78 for the purpose of providing a transverse oil passage through the pin. In assembly, the passage formed by the tube 78 aligns with a drilled passage 80 extending lengthwise through the connecting rod 12.

In accordance with the invention and as is best seen in FIGS. 3–5, the long upper insert bearing 40 is formed as a slipper-type bearing shell of less than semicylindrical arcuate extent and having arcuately extreme edges defined at least partially by coplanar surfaces 81, 82 which lie in a common plane 83 that also comprises a common chord of inner and outer cylindrical surfaces 84, 85 respectively of the bearing shell 40. In like manner, the relatively short lower insert bearings 41, 42 each comprise part cylindrical slipper-type bearing shells of less than semicylindrical arcuate extent and having arcuately extreme edges at least partially defined by coplanar surfaces 86, 87 which lie in a plane 88 that defines a common chord of the inner and outer cylindrical surfaces 89, 90 respectively of the bearing inserts 41, 42.

Similarly, the upper recess 35 has, arcuately extreme edges at least partially defined by coplanar surfaces 92, 93 lying in a plane 94 that defines a common chord of the semicylindrical recess 35. The surfaces 92, 93 are solely disposed in the portions of recess 35 within the pin encircling arms 31 since the saddle portion 32 between the arms 31 terminates, or is cut away, above the location of the edge surfaces 92, 93 and plane 94. The lower recesses 38 in the pin receiving arms likewise have arcuately extreme edges at least partly defined by coplanar surfaces 96, 97 lying in a plane 98 that defines a common chord of the arcuate cylindrical recesses 38. In assembly, planes 83 and 94 are identical as are planes 88 and 98, since their coplanar surfaces are engaged.

In operation, the fact that the piston head and skirt members are separately connected to the piston pin allows the skirt member to act essentially as a crosshead, taking side thrust loads from the cylinder liner, not shown, while the piston head absorbs the major gas forces which are transmitted to the piston pin through the relatively long insert bearing 40. Reverse thrust loads caused by centrifugal force and negative cylinder pressures acting on the piston head during an intake stroke are transmitted to the piston pin through the smaller bearing inserts 41, 42 located in recesses 38.

The interior of the piston head is cooled by oil delivered through the connecting rod passage 80 through the tube 78 and openings 68, 53, 52 of the pin 14 insert 40 and saddle portion 32 of the head to the interior thereof where it is splashed against the head by reciprocating motion of the piston. Close clearance between the head and skirt at the bosses 58 and ribs 62 maintains a body of cooling oil within the head. Excess oil is returned to the engine sump through the drain openings 49 and some lubricates the liner walls by passage through the clearance between the adjacent ends 28, 66 of the ring belt and skirt portions respectively. Some of the oil also lubricates the piston pin bearings 40–42 and the closure plates 64 direct oil reaching the pin ends to the drain openings 65 for return to the sump.

In accordance with the invention, the design of the bearing inserts and their associated recesses provides the ability to hold relatively close tolerances on the desired clearance between the cylindrical outer surface of the piston pin 14 and the associated inner surfaces 84, 89 of the insert bearings 40–42 as installed. Close tolerance manufacture of the insert bearings is made possible by using the coplanar edges of the inserts as dimensioning points from which to measure the height of each bearing insert. Control of the insert height, together with accurate control of the bearing thickness, provides an easy method of obtaining accurate diametral dimensions. This, together with a preferred method of finish machining the pin receiving openings 36, their recesses 35, 38 and edge surfaces 92, 93, 96, 97, i.e. by broaching with a predimensioned tool to hold close diametral tolerances provides the necessary dimensional control to obtain the desired clearance.

While the invention has been described by reference to a preferred embodiment, it should be understood that numerous changes could be made without departing from the spirit and scope of the inventive concepts described. Further it should be recognized that the bearing insert and recess configurations described herein may be utilized in many other bearing applications wherein insert bearings may be applied. Thus the invention is not intended to be limited to the specific embodiments described but to have the full scope permitted by the language of the following claims.

The embodiments of the invention in which an exclusive property or privilege is claimed are defined as follows:

1. A four-stroke cycle engine piston assembly comprising
    a connecting rod having a generally cylindrical piston pin secured to one end of said rod,
    a skirt member having an outer wall with a pair of oppositely disposed piston pin receiving openings through said wall, said piston pin extending into said openings and supporting said skirt for oscillating motion about the piston pin,
    a head member having a crown section connected with a peripheral depending ring belt section above said skirt member and having a piston pin connecting section internally depending from said crown section and extending within said skirt member, said pin connecting section including a pair of oppositely disposed downwardly extending pin encircling arms defining oppositely aligned pin receiving openings interconnected along upper edges by a downwardly opening saddle portion extending between the arms,
    a downwardly opening arcuate primary recess of less than semicylindrical extent in said saddle portion and extending outwardly into said pin receiving openings and a part cylindrical bearing shell insert of less than semicylindrical extent in said primary recess and engaging said piston pin to carry primary axial thrust forces therebetween,
    a pair of upwardly opening arcuate secondary recesses of less than semicylindrical extent in said pin receiving openings and a part cylindrical bearing shell insert of less than semicylindrical extent in each of said secondary recesses and engaging said piston pin to carry secondary axial reverse thrust forces therebetween,
    said inserts being restrained against substantial circumferential motion within said recesses by the engagement of coplanar surfaces of each of said inserts with mating surfaces of their respective recesses, said mating surfaces being provided at opposite arcuate edges of said inserts and recesses.

2. A piston assembly as in claim 1 wherein said mating surfaces of the respective recesses are also coplanar.

3. A piston assembly as in claim 2 wherein said coplanar surfaces of said primary and secondary recesses are solely disposed in said pin receiving openings in the arms at the edges of said saddle portion.

4. A reciprocating piston assembly comprising
    a connecting rod having at one end a force transmitting pin with at least one pair of part cylindrical surfaces facing oppositely along a force transmitting axis of the connecting rod,
    a piston having pin receiving means including opposed part cylindrical recesses of less than semicylindrical extent closely opposing said part cylindrical pin surfaces, and a part cylindrical bearing shell insert of less than semicylindrical extent in each of said recesses and engaging said part cylindrical surface to carry forces between the connecting rod and piston
    said inserts being circumferentially restrained in said recesses by the engagement of arcuately spaced coplanar surfaces of each of said inserts with mating surfaces of their respective recesses.

5. A piston assembly as in claim 4 wherein said mating surfaces of the respective recesses are also coplanar.

6. A piston assembly as in claim 5 wherein said mating coplanar surfaces of the inserts and recesses are provided at arcuately opposite edges of the inserts and recesses respectively.

7. A bearing assembly comprising a cylindrical opening having a pair of opposed part cylindrical recesses, at least one being of less than semicylindrical extent, and mating bearing inserts received in said recesses, said inserts being restrained against substantial circumferential motion within said recesses by engagement of coplanar surfaces of each of the inserts with mating surfaces of their respective recesses provided at arcuately opposite edges of said inserts and recesses respectively.

8. A bearing assembly comprising means
    defining a part cylindrical recess of less than semicylindrical extent and a mating bearing insert received in said recess, said insert being restrained against substantial circumferential motion within said recess by engagement of arcuately spaced coplanar surfaces on opposite edges of the insert with opposed arcuately spaced surfaces at opposite edges of the recess.

9. A bearing assembly as in claim 8 wherein said engaged surfaces at the opposite edges of the recess are also coplanar.

* * * * *